(12) United States Patent
Goose et al.

(10) Patent No.: US 12,054,185 B2
(45) Date of Patent: Aug. 6, 2024

(54) SYSTEM AND METHOD FOR MONITORING A RAILROAD GRADE CROSSING

(71) Applicant: Siemens Mobility, Inc., New York, NY (US)

(72) Inventors: Stuart Goose, Berkeley, CA (US); Stefan Fritschi, Louisville, KY (US); Mark Corbo, Prospect, KY (US)

(73) Assignee: Siemens Mobility, Inc, New York, NY (US)

( * ) Notice: Subject to any disclaimer, the term of this patent is extended or adjusted under 35 U.S.C. 154(b) by 1032 days.

(21) Appl. No.: 16/962,389

(22) PCT Filed: Aug. 23, 2018

(86) PCT No.: PCT/US2018/047630
§ 371 (c)(1),
(2) Date: Jul. 15, 2020

(87) PCT Pub. No.: WO2019/147306
PCT Pub. Date: Aug. 1, 2019

(65) Prior Publication Data
US 2021/0061328 A1    Mar. 4, 2021

Related U.S. Application Data

(60) Provisional application No. 62/621,071, filed on Jan. 24, 2018.

(51) Int. Cl.
*B61L 29/30* (2006.01)
*B61L 9/04* (2006.01)
(Continued)

(52) U.S. Cl.
CPC ............... *B61L 29/30* (2013.01); *B61L 9/04* (2013.01); *B61L 29/08* (2013.01); *B61L 29/228* (2013.01); *G01S 17/88* (2013.01)

(58) Field of Classification Search
CPC .......... B61L 29/30; B61L 29/08; B61L 29/22; B61L 29/228; B61L 29/06; B61L 9/04; B61L 23/041; G01S 17/88
See application file for complete search history.

(56) References Cited

U.S. PATENT DOCUMENTS 6,641,091 B1 * 11/2003  Hilleary ................. B61L 29/08
                                                              246/111
7,075,427 B1 *  7/2006  Pace ....................... B61L 23/06
                                                              246/126
(Continued)

FOREIGN PATENT DOCUMENTS

CN        102431579 A    5/2012
CN        203698314 U    7/2014
(Continued)

OTHER PUBLICATIONS

Hu Chunmei et al: "Technical Integration of Terrestrial LiDAR and Close-range Photogrammetry", p. 7-10, ISBN 978-7-5030-4020-7, May 31, 2017.

(Continued)

*Primary Examiner* — Zachary L Kuhfuss

(57) ABSTRACT

A system (200) for monitoring a railroad grade crossing (100, 250) includes an illumination device (220, 230) for illuminating a section of a railroad grade crossing (100, 250), and a control device (240) in communication with the illumination device (220, 230). The illumination device (220, 230) is configured to obtain data of the section of the railroad grade crossing (100, 250) while illuminating the section, and the control device (240) is configured to receive and evaluate the data. Further, a method (600) for monitoring a railroad grade crossing (100, 250) is provided.

14 Claims, 3 Drawing Sheets

(51) Int. Cl.
   *B61L 29/08*     (2006.01)
   *B61L 29/22*     (2006.01)
   *G01S 17/88*     (2006.01)

(56) References Cited

U.S. PATENT DOCUMENTS

| | | | |
|---|---|---|---|
| 8,676,411 B2 | 3/2014 | Kanner | |
| 2008/0169939 A1* | 7/2008 | Dickens | B61L 29/30 340/910 |
| 2014/0232566 A1* | 8/2014 | Mimeault | G01S 17/88 340/936 |
| 2014/0339374 A1* | 11/2014 | Mian | B61L 29/30 246/473.1 |
| 2015/0057851 A1* | 2/2015 | Turner | E01B 35/00 701/19 |
| 2016/0200334 A1* | 7/2016 | Hilleary | B61L 23/041 246/218 |
| 2019/0016358 A1* | 1/2019 | Clanney | B61L 29/30 |
| 2019/0135316 A1* | 5/2019 | Hilleary | G01S 13/62 |

FOREIGN PATENT DOCUMENTS

| | | |
|---|---|---|
| CN | 107067762 A | 8/2017 |
| DE | 102016217774 A1 | 10/2017 |
| EP | 1149371 B1 | 5/2007 |
| FR | 2943607 A3 | 1/2010 |
| JP | 2008176648 A | 7/2008 |
| JP | 2010042724 A | 2/2010 |
| WO | 2016042352 A1 | 3/2016 |
| WO | 2016153687 A1 | 9/2016 |
| WO | 2017160562 A1 | 9/2017 |

OTHER PUBLICATIONS

PCT International Search Report and Written Opinion of International Searching Authority mailed Nov. 23, 2018 corresponding to PCT International Application No. PCT/US2018/047630 filed Aug. 23, 2018.

* cited by examiner

SYSTEM AND METHOD FOR MONITORING A RAILROAD GRADE CROSSING

BACKGROUND

1. Field

Aspects of the present disclosure generally relate to a system and a method for monitoring a railroad grade crossing.

2. Description of the Related Art

Railroad grade crossings, herein also referred to as level crossings, grade crossings or simply crossings, are locations at which railroad tracks intersect roads. Warning systems have been developed to warn people and cars of an approaching train at a railroad grade crossing. Naturally, it is of utmost importance to try to avoid any accident within a grade crossing. For example, a de-railing of a train can be a catastrophic event. A crash of a train with a motorized vehicle or pedestrian often has a fatal outcome.

A constant warning time device, also referred to as a grade crossing predictor (GCP) or a level crossing predictor, is an electronic device that is connected to rails of a railroad track and is configured to detect presence of an approaching train and determine its speed and distance from a railroad grade crossing. The constant warning time device, in combination with a crossing controller, will use this information to generate constant warning time signal(s) for controlling crossing warning device(s).

A crossing warning device is a device that warns of the approach of a train at a crossing, examples of which include crossing gates with gate arms (e.g., the familiar red and white striped wooden or fiberglass arms often found at highway grade crossings to warn motorists of an approaching train), crossing lights (such as the red flashing lights often found at highway grade crossings in conjunction with the crossing gate arms discussed above), and/or crossing bells or other audio alarm devices.

Further, a vehicle presence detection system may be implemented in conjunction with crossing gates, for example to ensure that traffic within the crossing clears before crossing gates close or open. Vehicle presence detection systems are typically implemented at grade crossings with high train frequencies and traffic volumes. Other factors for implementing a vehicle presence detection system may include roadway width, track width and multiple tracks, queuing from adjacent intersections, driveways etc., grade crossing geometry, motorist behavior etc.

Currently, vehicle presence detection systems are implemented using induction loops. A construction crew digs up parts of the road on either side of the grade crossing and installs induction loops and associated cabling. A four-lane crossing (two lanes of road traffic in both directions) typically requires 12-16 induction loops and cables to be connected to a control system located in a crossing cabinet. The cabinet is located near the crossing and houses the power electronics, control system, safety alerts etc. of the grade crossing. The current solutions work sufficiently; however, installing induction loops is expensive and time consuming. Further, maintaining induction loops and associated equipment can be expensive.

SUMMARY

Briefly described, aspects of the present disclosure relate to a system and a method for monitoring railroad grade crossings.

A first aspect of the present disclosure provides a system for monitoring a railroad grade crossing comprising an illumination device for illuminating a section of a railroad grade crossing, and a control device in communication with the illumination device, wherein the illumination device is configured to obtain data of the section of the railroad grade crossing while illuminating the section, and wherein the control device is configured to receive and evaluate the data.

A second aspect of the present disclosure provides a method for monitoring a railroad grade crossing comprising obtaining data of a section of a railroad grade crossing while illuminating the section by at least one illumination device; receiving the data by a control device in communication with the at least one illumination device; and evaluating the data by the control device, wherein the control device is configured to communicate with components activating crossing warning devices.

DETAILED DESCRIPTION

To facilitate an understanding of embodiments, principles, and features of the present invention, they are explained hereinafter with reference to implementation in illustrative embodiments. In particular, they are described in the context of being a system and a method for monitoring a railroad grade crossing. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
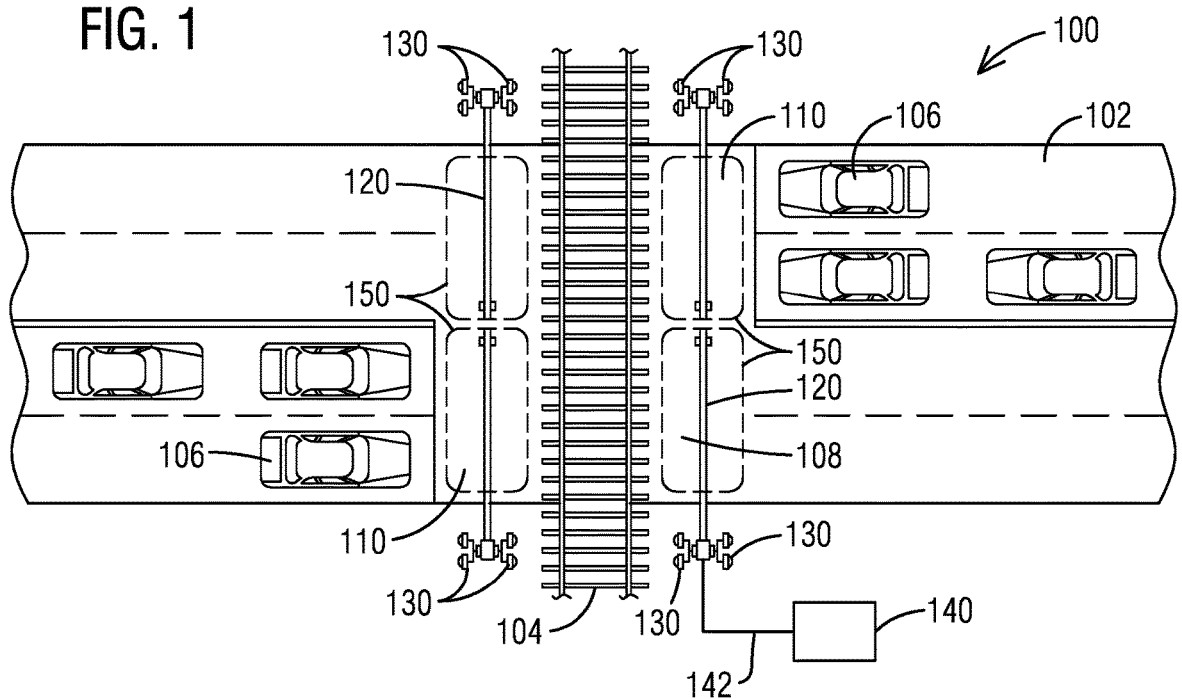
FIG. 1 illustrates a schematic of a known railroad grade crossing with a four-quadrant gate in accordance with an exemplary embodiment of the present disclosure.

FIG. 1 illustrates a schematic of a known railroad grade crossing 100 with a four-quadrant gate in accordance with an exemplary embodiment of the present disclosure. The railroad grade crossing 100 is provided at a location where a road 102 crosses a railroad track 104. Vehicles 106 are travelling along the road 102 in both directions.

The crossing 100 includes multiple railroad crossing warning devices, also referred to as grade crossing warning devices, which warn the vehicles 106 of the approach of a train at the crossing 100. The railroad crossing warning devices include a four-quadrant gate comprising two entrance gates 110 and two exit gates 120. The entrance and exit gates 110, 120 restrict access to track crossing area 108. The gates 110, 120 comprise gate arms with or without gate arm lights spaced along the arms. In addition to the gates 110, 120, crossing lamps (or lights) 130 are installed. Further railroad crossing warning devices may include a railroad crossbuck, crossing bells or other audio alarm devices.

The crossing 100 is provided as an example of a crossing. Each crossing may comprise different crossing warning devices. Also, there are different types of crossing gates. Standard gates, also known as two quadrant gates, consist of two entrance gates which prevent approaching vehicles from entering the crossing area 108. Four-quadrant gates are implemented to prevent drivers from illegally driving their vehicles around lowered entrance gates 110.

The crossing warning devices 110, 120, 130 are in communication with a grade crossing predictor (GCP) system 140 via connecting elements 142, which are for example electric cables. A connection between GCP system 140 and crossing warning devices 110, 120, 130 is shown exemplary only for some crossing warning devices 110, 120, 130. Further, it should be noted that the components are illustrated schematically and are not drawn to scale, in particular are not drawn to scale in relation to each other.

As previously noted, GCP system 140, in conjunction with electric circuits installed in the track 104, is configured to detect the presence of an approaching train, determine its speed and distance from the railroad crossing 100, calculates when the train will arrive at the crossing 100, and will use this information to generate constant warning time signals for controlling the crossing warning devices 110, 120, 130. Typically, a crossing controller, which can be for example a normally energized master relay, is arranged between the GCP system 140 and the warning devices 110, 120, 130, for example along and operably coupled by the connecting elements 142, wherein an output of the GCP system 140 feeds a coil of the master relay. According to a pre-programmed time, for example a number of seconds and/or minutes, before projected arrival time of the approaching train, the GCP system 140 is configured such that the output feeding the coil of the master relay is turned off to drop the master relay and to activate the crossing warning devices 110, 120, 130. Other configurations of a crossing controller are possible. It should be noted that the GCP system 140, the master relay (crossing controller) and the warning time devices 110, 120, 130 will not be described in further detail as those of ordinary skill in the art are familiar with these devices and systems.

The railroad grade crossing 100 may further comprise a vehicle presence detection system in conjunction with the entrance and exit gates 110, 120, primarily to maintain the exit gates 120 in a raised position until traffic within the crossing area 108 clears. The vehicle presence detection system is implemented and illustrated by induction loops 150 (in dotted lines), located between the entrance/exit gates 110, 120 and the railroad track 104 in the track crossing area 108. The induction loops 150 are installed in the road 102 and provide electromagnetic detection of vehicles, such as vehicles 106. Installing multiple induction loops 150 is expensive and time consuming. Further, maintaining induction loops and associated equipment can be expensive.

New sensor technologies offer opportunities to avoid digging up roads thus reducing the installation and time as well as maintenance costs, and the ability to detect and classify in real-time a much wider range of real-world events and react accordingly.

Figure 2:
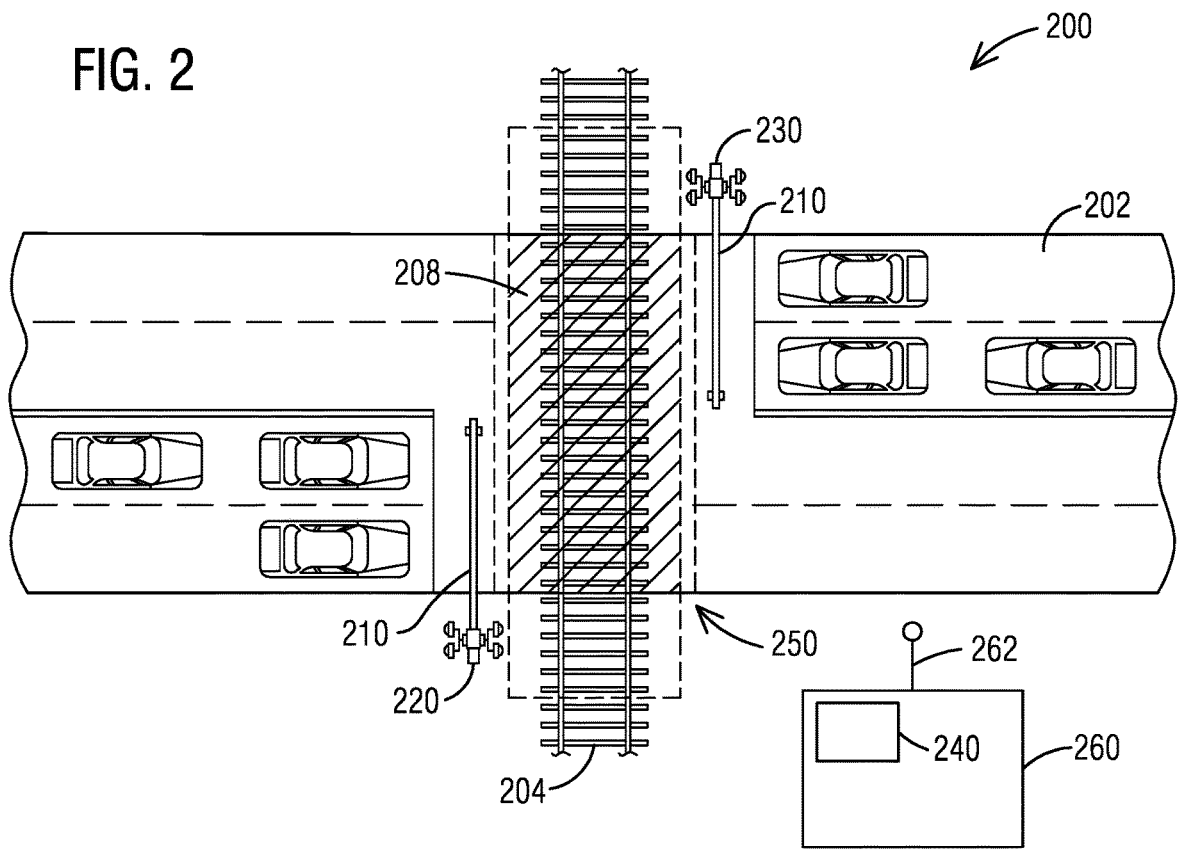
FIG. 2 illustrates a schematic of railroad grade crossing with a monitoring system in accordance with an exemplary embodiment of the present disclosure.

FIG. 2 illustrates a system 200 for monitoring a railroad grade crossing 250 in accordance with an exemplary embodiment of the present disclosure. The system 200 is herein also referred to as monitoring system 200. Road 202 crosses railroad track 204 at the crossing 250. Vehicle traffic approaching the crossing 250 is illustrated by arrows.

The railroad grade crossing 250 comprises a two-quadrant gate comprising two entrance gates 210. The entrance gates 210 restrict access to the track crossing area 208, also known as crossing zone. The track crossing area 208 (shaded area in FIG. 2) is the area that is common to the road 202 and railroad track 204, and specifically between the entrance gates 210, and if installed, exit gates.

The entrance gates 210 comprise gate arms with or without gate arm lights spaced along the arms. Further crossing warning devices may include crossing lamps, a railroad crossbuck, crossing bells or other audio alarm devices. It should be noted that the railroad grade crossing 250 is an example used in connection with the system 200. However, the crossing 100 as illustrated in FIG. 1 or many other embodiments of railroad grade crossing can be used in connection with the monitoring system 200.

The system 200 comprises at least one illumination device 220 for illuminating a section of the crossing 250. The exemplary embodiment of FIG. 2 comprises two illumination devices 220, 230 arranged on opposite sides of the railroad track 206 as well as on opposite sides of the road 204. The system 200 may comprise more than two illumination devices 220, 230, for example three or four illumination devices positioned at different points of the crossing 250. The illumination devices 220, 230 are substantially the same and comprise the same main functionalities. Each illumination device 220, 230 is configured to obtain data of a section of the railroad grade crossing 250 while illuminating the section, wherein the section is specifically a section of the crossing area 208.

A control device 240 is in communication with the illumination device(s) 220, 230. The control device 240 is configured to receive and evaluate the data of the illumination device(s) 220, 230. Further, the control device 240 is configured to detect, track and classify an object within the section based on the data of the illumination device(s) 220, 230. In a further embodiment, the control device 240 is configured to communicate with components activating crossing warning devices, such as for example the entrance gates 110.

While illuminating, the illumination device(s) 220, 230, scan surroundings and periphery of the crossing 250 and obtain data which are evaluated by the control device 240. The control device 240 is configured, for example by one or more software applications, to detect, track and classify objects, such as cars and pedestrians, in and around the critical crossing area 208. Once an object has been detected in the crossing area 208, predefined actions can be performed. For example, if a vehicle or pedestrian is detected within the crossing area 208, and a train is approaching the crossing 250, lights and/or sounds may be activated to alarm the driver or pedestrian to leave the crossing 250. Further, entrance gates 210 and/or exit gates, if existing, may be raised so that a vehicle or other object is able to leave the crossing area 208.

Each illumination device 220, 230 comprises a lidar sensor. Lidar (or LiDAR) stands for "Light Detection And Ranging" and is a modern surveying method that measures distance to a target by illuminating that target with a pulsed laser light at 905 nm, and measures reflected pulses with a sensor. Differences in laser return times (time of flight) and wavelengths return a point cloud from which a digital 3D reconstruction of the target can be made. Additional processing offers real-time imaging and object classification, for example on cars, trucks, bikes, people and fixed objects.

In accordance with an exemplary embodiment, each illumination device 220, 230 comprises a lidar sensor, wherein the lidar sensor comprises at least one laser beam configured to rotate around 360 degrees multiple times per second. In another embodiment, the lidar sensor may comprise multiple vertically aligned laser beams, for example six or eight laser beams, that rotate around 360 degrees numerous times per second. This enables a sensor to capture a point cloud of the surrounding environment with high accuracy on a continuous basis, for example at 60 frames per second (fpr). Currently, lidar offers the most reliable solution for object detection.

In a further embodiment, the illumination device(s) 220, 230 are arranged on existing crossing infrastructure of the railroad grade crossing 250. For example, the illumination device(s) 220, 230 may be arranged on a pole or post of an existing crossing warning device.

Further, the illumination device(s) 220, 230, e.g., lidar sensor, is powered by a power supply. In an embodiment, the illumination device 220, 230 receive constant power via crossing equipment, for example a crossing controller located in the crossing bungalow 260.

In an example, the control device 240 is housed in a crossing bungalow 260, which is typically located close to a railroad grade crossing. The crossing bungalow 260 includes equipment and devices necessary for controlling the grade crossing 250, such as for example GCP and crossing controller.

In an embodiment, the illumination device(s) 220, 230 and the control device 240 communicate via a wired connection, for example via Ethernet cable. In another embodiment, the illumination device(s) 220, 230 and the control device 240 communicate wirelessly. If communication is wireless, the illumination device(s) 220, 230 and control device 240 comprise for example an air interface, e.g. Wi-Fi, to communicate wirelessly for example via Internet. An antenna 262, for example mounted on the crossing bungalow 260, if the control device 240 is located in the crossing bungalow 260, can be used for a wireless communication between the control device 240 and the illumination device(s) 220, 230. Alternatively, the control device 240 may be located remotely to the grade crossing 250, for example at a central train operator station or a rail operations center. In such a case, signals and/or data are transmitted wirelessly by the illumination device(s) 220, 230 to the control device 240.

As described before, the monitoring system 200 with control device 240 and illumination device(s) 220, 230 detect, track and classify objects, specifically vehicles, cyclists and pedestrians, within a track crossing area 108, 208 of a grade crossing 100, 250 to increase safety and to avoid or mitigate accidents within critical areas of the grade crossing 100, 250.

Further applications of the monitoring system 200 can include for example counting train wagons of a train traveling through the grade crossing 100, 250 to ensure that the train is still complete, detecting the train's direction, or measuring the train's speed. Further, the monitoring system 200 may replace an island circuit of the grade crossing 100, 250. The island circuit of a grade crossing stretches across the track crossing area 108, 208 (plus 50 feet or sometimes a little more) on either side of the crossing area 108, 208. Any occupancy of the island circuit will activate crossing warning devices, such as for example devices 110, 120, 130, 210. Any end-of-occupancy of the island circuit will deactivate the crossing warning devices. Thus, a train leaving the crossing area 108, 208 exits the island circuit and deactivates the warning devices. The monitoring system 200 may be utilized instead of the island circuit.

A further application of the monitoring system 200 can be advanced traffic preemption. In this case, the monitoring system 200 detects approaching trains long, e.g., several miles, before they reach the grade crossing 250. A signal is sent to a traffic lights controller, which in turn goes into a preset mode enabling all road traffic to flow and thus steer clear of the grade crossing 250 before it is activated. This ensures that no vehicles get trapped on the grade crossing 250 due to backed up traffic for example from a near road traffic light.

Figure 3:
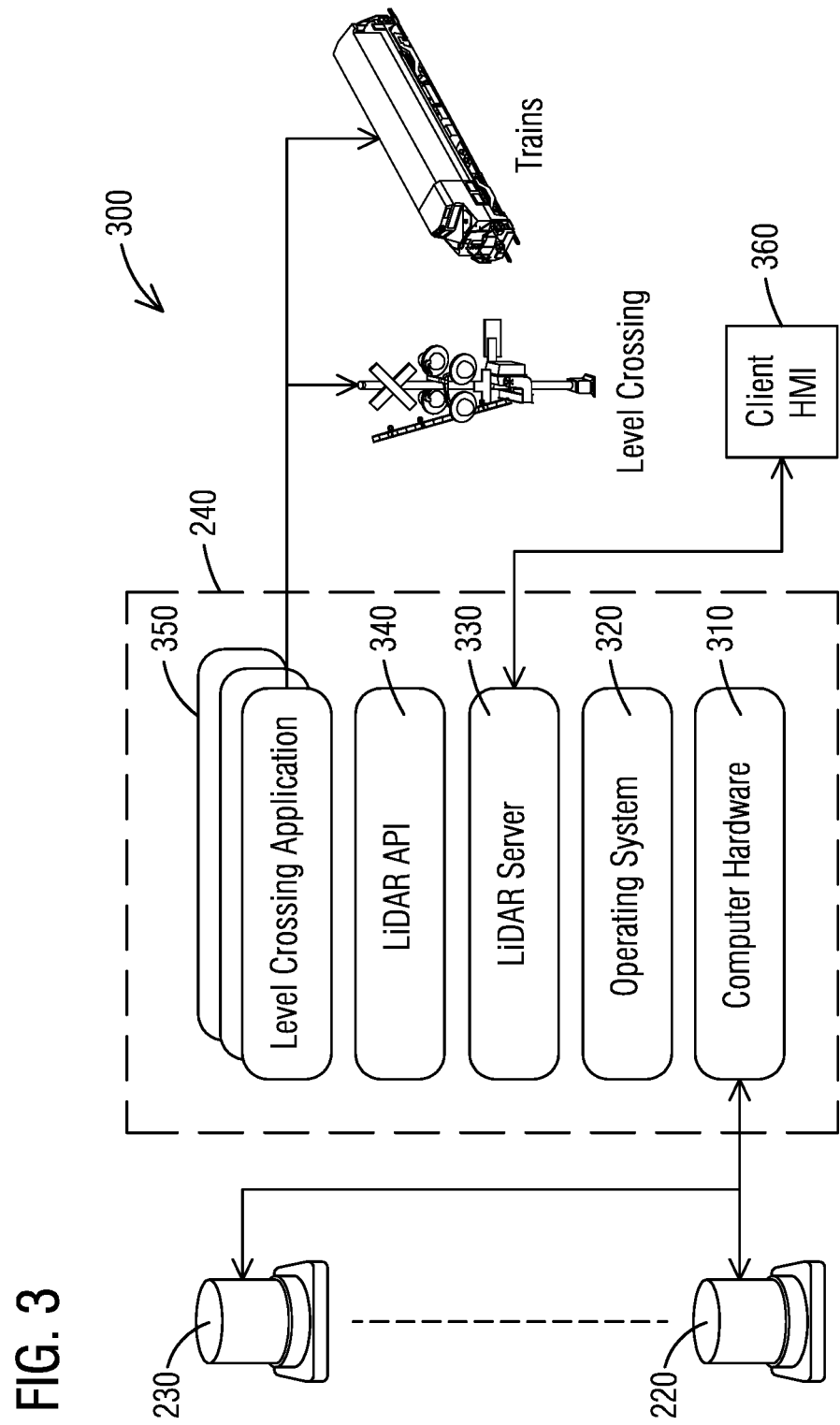
FIG. 3 illustrates a first schematic diagram of a system architecture of a monitoring system in accordance with an exemplary embodiment of the present disclosure.

FIG. 3 illustrates a first schematic diagram of a system architecture 300 of a monitoring system 200 in accordance with an exemplary embodiment of the present disclosure. The system architecture 300 can be used for the monitoring system 200 as described for example with respect to FIG. 2. The monitoring system 200 can be used for level crossings 100, 250 as described with respect to FIG. 1 and FIG. 2.

FIG. 3 illustrates components of the control device 240. The control device 240 is in communication with the illumination device(s) 220, 230 and receives data and information from the illumination device(s) 220, 230. Such data and information relate to laser return times (time of flight) and wavelengths, specifically differences in laser return times and wavelengths of reflected pules based on transmitted pulses laser light by the illumination device(s) 220, 230. The control device 240 is configured to evaluate the data and information, for example generate 3D reconstructions of objects based on a point cloud of laser return times and wavelengths of the reflected pulses.

The control device 240 may be embodied as software or a combination of software and hardware. According to the example of FIG. 3, the control device 240 is embodied as a combination of software and hardware. The control device 240 comprises computer hardware 310, which can be for example an industrial PC. Industrial computers are intended for industrial purposes and are primarily used for process control and/or data acquisition. However, it should be noted that other types of computer hardware may be used suitable to perform the function of the control device 240. The computer hardware 310 runs a robust embedded operating system 320. The operating system 320 (system software) manages the computer hardware 310 and software resources of the control device 240. Further, the control device 240 comprises a server 330, also referred to as lidar server 330, which is a software application for detecting, tracking and classifying objects within designated area(s) of a grade crossing based on data and information provided by the illumination device(s) 220, 230. The objects are detected, tracked and classified accurately in real-time by the lidar server 330.

According to an exemplary embodiment, the control device 240 may comprise one or more further software applications, for example level crossing application 350, which utilize processed data or information from the lidar server 330. The lidar server 330 and further applications, including application 350, communicate via application programming interface (API) 340. Such further software applications may perform specific tasks. For example, level crossing application 350 may generate and transmit control message(s) to an approaching train to ensure safe behavior. The level crossing application 350 may gather and forward logging information about the level crossing or detect and confirm that crossing gates open and close as expected. Another software application may detect anomalies within track crossing area that pose a safety risk and trigger a corresponding action.

In a further embodiment, an external computer executing a client human-machine-interface (HMI) 360 connects to the lidar server 330 executing on the computer hardware 310 to calibrate and/or configure settings. In addition, the client HMI 360 may be used to visualize real-time operation of a level crossing 100, 250.

In another example, the control device 240 may be an existing device programmed to interact with the illumination device(s) 220, 230. For example, the control device 240 may be incorporated into an existing wayside control device, for example constant warning device or crossing controller, by means of software. The control device 240 may be a module programmed into an existing crossing controller.

Figure 4:
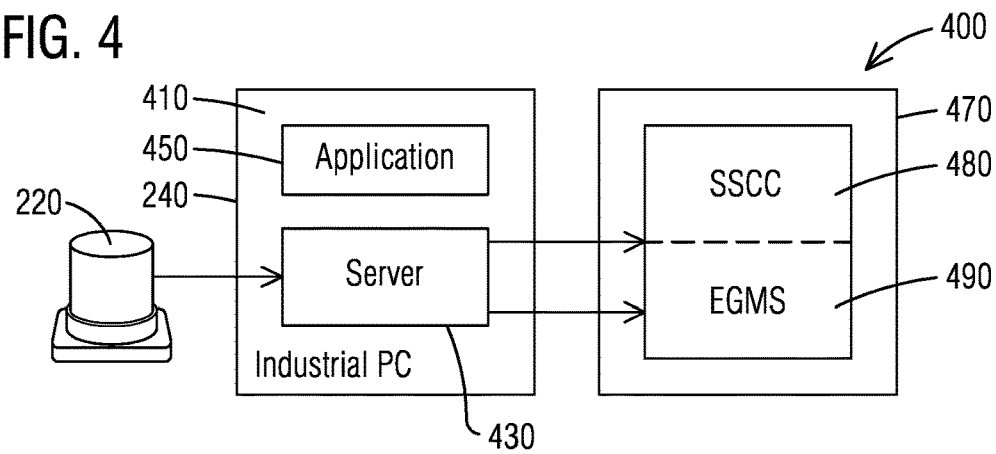
FIG. 4 illustrates a second schematic diagram of a system architecture of a monitoring system in accordance with an exemplary embodiment of the present disclosure.
Figure 5:
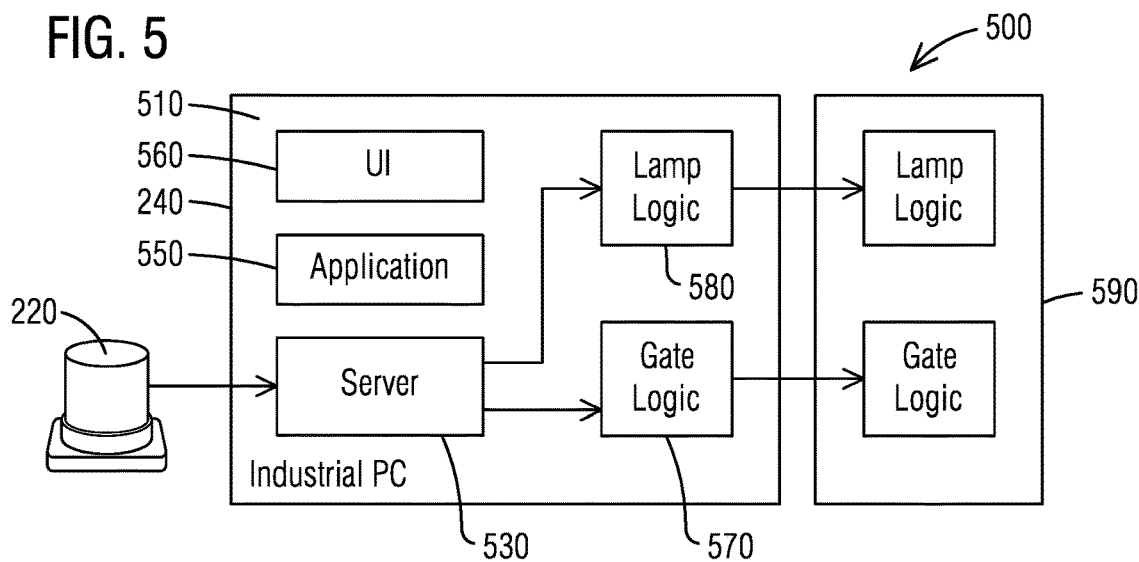
FIG. 5 illustrates a third schematic diagram of a system architecture of a monitoring system in accordance with an exemplary embodiment of the present disclosure.

FIG. 4 illustrates a second schematic diagram of a system architecture 400 and FIG. 5 illustrates a third schematic diagram of a system architecture 500 of a monitoring system 200 in accordance with an exemplary embodiment of the present disclosure. The system architectures 400, 500 can be used for the monitoring system 200 as described for example with respect to FIG. 2 in combination with level crossings 100, 250 as described with respect to FIG. 1 and FIG. 2. The system architectures 400, 500 comprise similar elements as the system architecture 300 and thus will not be described in detail with respect to such elements.

FIG. 4 and FIG. 5 illustrate illumination device 220, embodied as lidar sensor, in communication with control device 240. In both embodiments, the control device 240 comprises hardware in the form of an industrial PC. The industrial PC runs the server 430, 530, embodied as lidar server, which is the software application for detecting, tracking and classifying objects within designated area(s) of a grade crossing based on data and information provided by the illumination device 220. The objects are detected, tracked and classified accurately in real-time by the lidar server 430, 530. The control device 240 further comprises one or more applications 450, 550 for processing data and and/or performing specific tasks based on the data and information provided by the server 430, 530.

According to the embodiment of FIG. 4, the server 430 transmits signals, for example bits, to wayside control unit 470, which can be for example a wayside crossing controller or grade crossing predictor. Specifically, server 430 sends bits to solid state crossing controller (SSCC) 480 and to exit gate management system (EGMS) 490. The bits transmitted by the server 430 can be for example relating to occupancy status and health status of the surveyed areas, specifically the grade crossing. Based on the transmitted bits, the EGMS 490 may trigger an exit gate of the grade crossing to open so that any "trapped" vehicles can leave the crossing area. The SSCC may trigger a crossing warning device to activate.

The embodiment according to FIG. 5 is similar to the embodiment according to FIG. 4, but the control device 240 additionally comprises a user interface (UI) 560 to interact with the server 530 and/or application 550, for example modify settings or modify the application 550, wherein the UI 560 is implemented on the industrial PC 510. The architecture 500 comprises logic 570 for crossing gates (entrance/exit gates) and logic 580 for crossing lights, crossing bell etc. running on the computer hardware, i.e. the industrial PC 510. The crossing control 590 for the crossing gates and the crossing lights and bell run on a separate dedicated hardware component.

Figure 6:
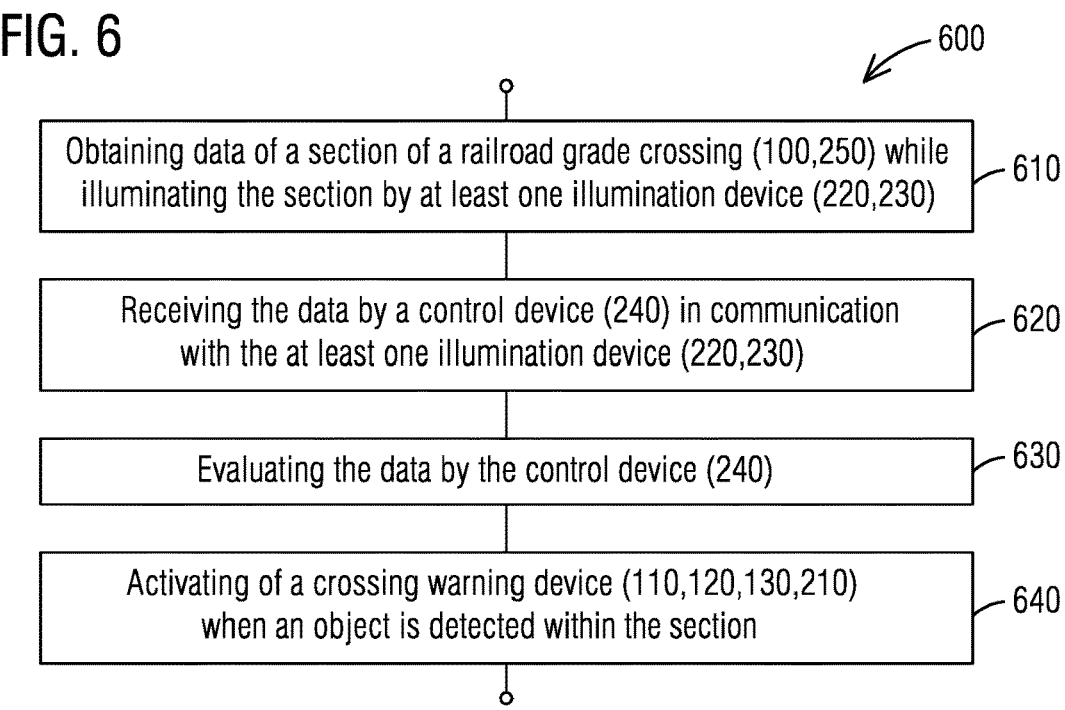
FIG. 6 illustrates a flow chart of a method for monitoring a railroad grade crossing in accordance with an exemplary embodiment of the present disclosure.

FIG. 6 illustrates a flow chart of a method 600 for monitoring a railroad grade crossing in accordance with an exemplary embodiment of the present disclosure. The method 600 can be used for the monitoring system 200 as described for example with respect to FIG. 2 in combination with level crossings 100, 250 as described with respect to FIG. 1 and FIG. 2. The method 600 comprises elements of the monitoring system 200 that have already been described in detail and will thus not be described in detail with respect to the method 600.

The method 600 comprises obtaining 610 data of a section of a railroad grade crossing 100, 250 while illuminating the section by at least one illumination device 220, 230, receiving 620 the data by a control device 240 in communication with the at least one illumination device 220, 230, and evaluating 630 the data by the control device 240, wherein the control device 240 is configured to communicate with components activating crossing warning devices 110, 120, 130, 210. The evaluating 630 comprises detecting, tracking and classifying an object within the section based on the data of the at least one illumination device 220, 230. The method 600 further comprises activating 640 of a crossing warning device 110, 120, 130, 210 when an object is detected within the section.

The system 200 and method 600 provide a 360-degree view by mounting illumination devices 220, 230 on a level crossing 100, 250 at appropriate locations. Optimal device installation positions can be evaluated in simulation. Installation and calibration of the devices 220, 230 (lidar sensors) is fast and easy. Real-time imaging and object classification can be performed at 60 frames per second (fpr) with respect to cars, trucks, bikes, people and fixed objects. The system 200 is robust in varying lighting and weather conditions, unlike for example video cameras. Further, the system 200 is less expensive compared to for example a vehicle presence detection system operating with induction loops in the road.

The invention claimed is:

1. A system for monitoring a railroad grade crossing comprising:
    an illumination device comprising a lidar sensor for illuminating a section of a railroad grade crossing, and
    a control device in communication with the illumination device,
    wherein the illumination device is configured to obtain data of the section of the railroad grade crossing while illuminating the section, and
    wherein the control device is configured to receive and evaluate the data,
    wherein the control device is configured to detect, track and classify an object within the section based on the data of the illumination device,
    wherein a classification comprises determining whether the object is any one of a vehicle, a cyclist, and a pedestrian,
    wherein the control device is configured to trigger activation of an entrance gate and/or exit gate to a raised position when the classified object is a vehicle, and
    wherein the control device is further configured to detect a direction of a train and measure a speed of the train based on data obtained by the illumination device when the train travels through the railroad grade crossing.

2. The system of claim 1, wherein the section comprising a track crossing area.

3. The system of claim 1, wherein the control device is configured to communicate with components activating crossing warning devices.

4. The system of claim 1, wherein the control device is configured to trigger activation of a crossing warning device of the railroad grade crossing when an object is detected within the section.

5. The system of claim 1, wherein the lidar sensor comprises at least one laser beam configured to rotate around 360 degrees multiple times per second.

6. The system of claim 1, wherein the illumination device is arranged on an existing crossing infrastructure of the railroad grade crossing.

7. The system of claim 1, wherein the control device is located in a crossing bungalow.

8. The system of claim 1, wherein the illumination device and the control device communicate via a wired connection, the wired connection comprising Ethernet connection.

9. The system of claim 1, wherein the illumination device and the control device communicate via a wireless connection.

10. The system of claim 1, comprising a plurality of illumination devices positioned to scan areas of the railroad grade crossing including a track crossing area, areas of a road and a railroad track around the track crossing area.

11. The system of claim 1, wherein the control device comprises an industrial PC.

12. The system of claim 1, wherein the control device comprises a user interface or is coupled to a client HMI.

13. A method for monitoring a railroad grade crossing comprising:
    obtaining data of a section of a railroad grade crossing while illuminating the section by at least one illumination device, the at least one illumination device comprising a lidar sensor;
    receiving the data by a control device in communication with the at least one illumination device;
    evaluating the data by the control device, wherein the control device is configured to communicate with components activating crossing warning devices,
    wherein the evaluating comprises detecting, tracking, and classifying an object within the section based on the data of the at least one illumination device,
    wherein a classification comprises determining whether the object is any one of a vehicle, a cyclist, and a pedestrian, and
    wherein the crossing warning device comprises crossing gates, and wherein a crossing entrance gate and/or crossing exit gate is raised, and further comprising
    detecting a direction of a train and measuring a speed of the train based on data obtained by the illumination device when the train travels through the railroad grade crossing.

14. The method of claim 13, further comprising:
    activating of a crossing warning device when an object is detected within the section.

* * * * *